(12) United States Patent
Fok et al.

(10) Patent No.: US 10,901,874 B2
(45) Date of Patent: Jan. 26, 2021

(54) SHADOW TESTING (71) Applicant: Sony Interactive Entertainment LLC, San Mateo, CA (US)

(72) Inventors: Stephanie Fok, San Mateo, CA (US); Karthik Prasad, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 91 days.

(21) Appl. No.: 15/984,216

(22) Filed: May 18, 2018

(65) Prior Publication Data
US 2019/0354466 A1 Nov. 21, 2019

(51) Int. Cl.
G06F 11/00 (2006.01)
G06F 11/36 (2006.01)
G06F 9/54 (2006.01)

(52) U.S. Cl.
CPC .......... *G06F 11/3664* (2013.01); *G06F 9/547* (2013.01); *G06F 11/366* (2013.01); *G06F 11/3692* (2013.01)

(58) Field of Classification Search
CPC .......... G06F 11/0748; G06F 11/2294
USPC ...................................... 714/38.14
See application file for complete search history.

(56) References Cited

U.S. PATENT DOCUMENTS

| | | | | |
|---|---|---|---|---|
| 7,761,259 B1* | 7/2010 | Seymour | ............. | G06F 11/3409 702/182 |
| 8,001,422 B1* | 8/2011 | Sun | ....................... | G06F 11/263 714/25 |
| 8,990,778 B1* | 3/2015 | Allocca | ................ | G06F 11/3692 717/126 |
| 2007/0240154 A1 | 10/2007 | Gerzymisch et al. | | |
| 2008/0301511 A1* | 12/2008 | Miller | .............. | G01R 31/31926 714/733 |
| 2012/0030513 A1* | 2/2012 | Peng | ................... | G06F 11/2097 714/37 |
| 2012/0124413 A1* | 5/2012 | Bauer | .................. | H04Q 3/0062 714/4.11 |
| 2014/0089735 A1* | 3/2014 | Barrett | ................ | G06F 11/3495 714/27 |

(Continued)

OTHER PUBLICATIONS

U.S. Appl. No. 15/991,391 Office Action dated Aug. 22, 2019.

(Continued)

*Primary Examiner* — Sarai E Butler
(74) *Attorney, Agent, or Firm* — Polsinelli LLP (57) ABSTRACT

Systems and methods for shadow testing are provided. A new service may be brought online that corresponds to an existing service. The new service may be designated for shadow testing. A call may be received for the existing service from a calling device. The received call may be provided to the existing service, while an asynchronous call corresponding to the received call may be provided to the new service. A result may be received from the existing service in response to the provided call, and a result may be received from the new service in response to the asynchronous call. The result received from the existing service may be used in responding to the received call. Data regarding the result received from the new service may be logged, but the result received from the new service may be excluded from use in responding to the received call. One or more metrics evaluating performance by the new service may be generated.

18 Claims, 4 Drawing Sheets

(56) References Cited

U.S. PATENT DOCUMENTS

| | | |
|---|---|---|
| 2015/0020055 A1 | 1/2015 | Nayak |
| 2015/0135158 A1 | 5/2015 | Tenev et al. |
| 2015/0347284 A1 | 12/2015 | Hey et al. |
| 2017/0245013 A1* | 8/2017 | Wolff ................. H04N 21/4334 |
| 2018/0039565 A1* | 2/2018 | Rajagopalan ....... G06F 11/3676 |
| 2018/0373865 A1* | 12/2018 | Acar .................... G06F 21/552 |
| 2019/0370156 A1 | 12/2019 | Kunar |

OTHER PUBLICATIONS

U.S. Appl. No. 15/991,391, John A. Elias Kuner, Code Coverage, filed May 29, 2018.
U.S. Appl. No. 15/991,391 Office Action dated Dec. 14, 2018.
U.S. Appl. No. 15/991,391 Final Office Action dated Apr. 8, 2019.

* cited by examiner

SHADOW TESTING

BACKGROUND OF THE INVENTION

1. Field of the Invention

The present invention generally relates to shadow testing. More specifically, the present invention relates to parallel shadow testing of new services.

2. Description of the Related Art

Presently available digital services are generally provided over communication networks to client devices via servers. A service may be distributed across multiple processes or devices. In some instances a service may be interdependent on other services. Such a service may require other services in order to perform its respective function, as well as having such function required by other services to perform theirs.

As such, the failure of one service may have multiple different downstream effects on multiple other services that are provided to clients. Such a service may be either provided to customers or internally. Notwithstanding, such interdependency means that when new services are deployed and come online, a company may be concerned that their internal or customer-facing services not suffer from any failure. Without deploying the new service, however, it is difficult to evaluate whether that new service would fail or otherwise suffer from other issues, including latency, errors, load issues, and other operational problems.

There is, therefore, a need in the art for improved systems and methods for shadow testing.

SUMMARY OF THE CLAIMED INVENTION

Embodiments of the present invention allow for shadow testing. A new service may be brought online that corresponds to an existing service. The new service may be designated for shadow testing. A call may be received for the existing service from a calling device. The received call may be provided to the existing service, while an asynchronous call corresponding to the received call may be provided to the new service. A result may be received from the existing service in response to the provided call, and a result may be received from the new service in response to the asynchronous call. The result received from the existing service may be used in responding to the received call. Data regarding the result received from the new service may be logged, but the result received from the new service may be excluded from use in responding to the received call. One or more metrics evaluating performance by the new service may be generated.

Various embodiments of the present invention may include methods for shadow testing. Such methods may include bringing online a new service corresponding to an existing service where the new service is designated for shadow testing, receiving a call for the existing service from a calling device, providing the received call to the existing service, providing an asynchronous call corresponding to the received call to the new service, receiving a result from the existing service in response to the provided call and a result from the new service in response to the asynchronous call, providing the result received from the existing service for use in responding to the received call, logging data regarding the result received from the new service but excluding the result received from the new service from use in responding to the received call, and generating one or more metrics evaluating performance by the new service.

Yet further embodiments of the present invention may include non-transitory computer-readable storage media having embodied thereon a program executable by a processor to perform a method for shadow testing as described above.

DETAILED DESCRIPTION

Embodiments of the present invention allow for shadow testing. A new service may be brought online that corresponds to an existing service. The new service may be designated for shadow testing. A call may be received for the existing service from a calling device. The received call may be provided to the existing service, while an asynchronous call corresponding to the received call may be provided to the new service. A result may be received from the existing service in response to the provided call, and a result may be received from the new service in response to the asynchronous call. The result received from the existing service may be used in responding to the received call. Data regarding the result received from the new service may be logged, but the result received from the new service may be excluded from use in responding to the received call. One or more metrics evaluating performance by the new service may be generated.

Figure 1:
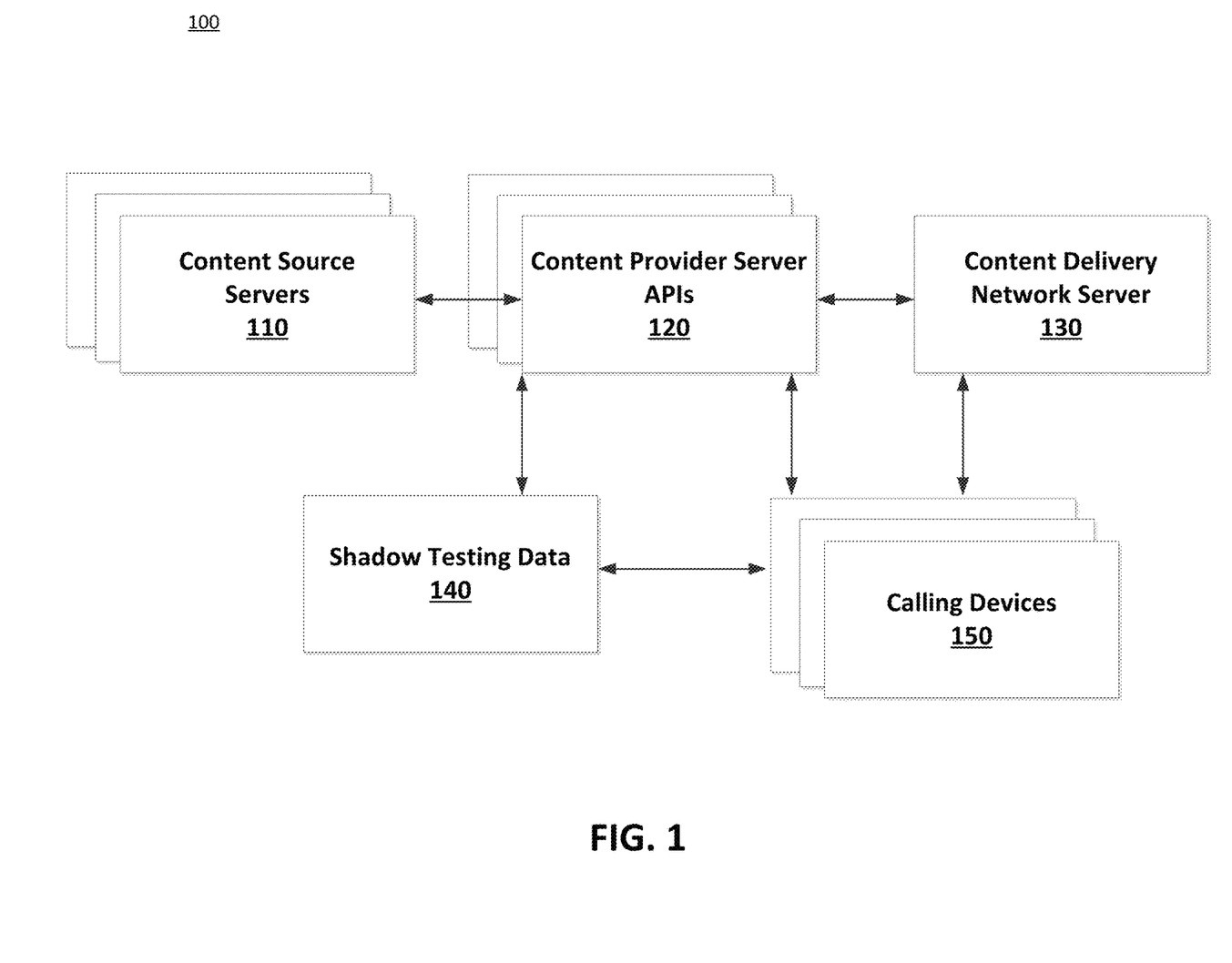
FIG. 1 illustrates an exemplary network environment in which a system for shadow testing may be implemented.

FIG. 1 illustrates a network environment 100 in which a system for shadow testing may be implemented. The network environment 100 may include one or more content source servers 110 that provide digital content (e.g., games, other applications and services) for distribution, one or more content provider server application program interfaces (APIs) 120, content delivery network server 130, a shadow testing data server 140, and one or more calling devices 150. The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content source servers 110 may maintain and provide a variety of content available for distribution. The content source servers 110 may be associated with any content provider that makes its content available for access over a communication network. Such content may include not only digital games, but also other types of digital applications and services. Such applications and services may include any variety of different digital content and functionalities that may be provided to calling devices 150.

The content from content source server 110 may be provided through a content provider server API 120, which allows various types of content sources server 110 to communicate with other servers in the network environment 100 (e.g., calling devices 150). The content provider server API 120 may be specific to the particular language, operating system, protocols, etc. of the content source server 110 providing the content, as well as the calling devices 150. In a network environment 100 that includes multiple different types of content source servers 110, there may likewise be a corresponding number of content provider server APIs 120 that allow for various formatting, conversion, and other cross-device and cross-platform communication processes for providing content and other services to different calling devices 150, which may use different operating systems, protocols, etc., to process such content. As such, applications and services in different formats may be made available so as to be compatible with a variety of different calling device 150.

The content provider server API 120 may further facilitate access of each of the calling devices 150 to the content hosted or services provided by the content source servers 110, either directly or via content delivery network server 130. Additional information, such as metadata, about the accessed content or service can also be provided by the content provider server API 120 to the calling device 150. As described below, the additional information (i.e. metadata) can be usable to provide details about the content or service being provided to the calling device 150. In some embodiments, the services provided from the content source servers 110 to the calling device 150 via the content provider server API 120 may include supporting services that are associated with other content or services, such as chat services, ratings, and profiles that are associated with a particular game, team, community, etc. In such cases, the content source servers 110 may also communicate with each other via the content provider server API 120.

The content delivery network server 130 may include a server that provides resources, files, etc., related to the content from content source servers 110, including various content and service configurations, to calling devices 150. The content delivery network server 130 can also be called upon by the calling devices 150 that request to access specific content or services. Content delivery network server 130 may include universe management servers, game servers, streaming media servers, servers hosting downloadable content, and other content delivery servers known in the art.

Shadow testing data server 140 may include any data server known in the art. In some embodiments, the shadow testing data server 140 may be inclusive of the new service being deployed and tested, while in other embodiments, shadow testing data server 140 may be a separate server that receives data regarding shadow testing of the new service. As. such, shadow testing data server 140 may also communicate with other servers in network environment 100 via one or more content provider server APIs 120.

The calling device 150 may include a plurality of different types of computing devices. The calling device 150 may be a server that provides an internal service (e.g., to other servers) in network environment 100. In such cases, calling device 150 may correspond to one of the content servers 110 described herein. Alternatively, the calling device 150 may be a client device that may include any number of different gaming consoles, mobile devices, laptops, and desktops. Such calling devices 150 may also be configured to access data from other storage media, such as, but not limited to memory cards or disk drives as may be appropriate in the case of downloaded services. Such calling devices 150 may include standard hardware computing components such as, but not limited to network and media interfaces, non-transitory computer-readable storage (memory), and processors for executing instructions that may be stored in memory. These calling devices 150 may also run using a variety of different operating systems (e.g., iOS, Android), applications or computing languages (e.g., C++, JavaScript). An exemplary client device 150 is described in detail herein with respect to FIG. 4.

Figure 2:
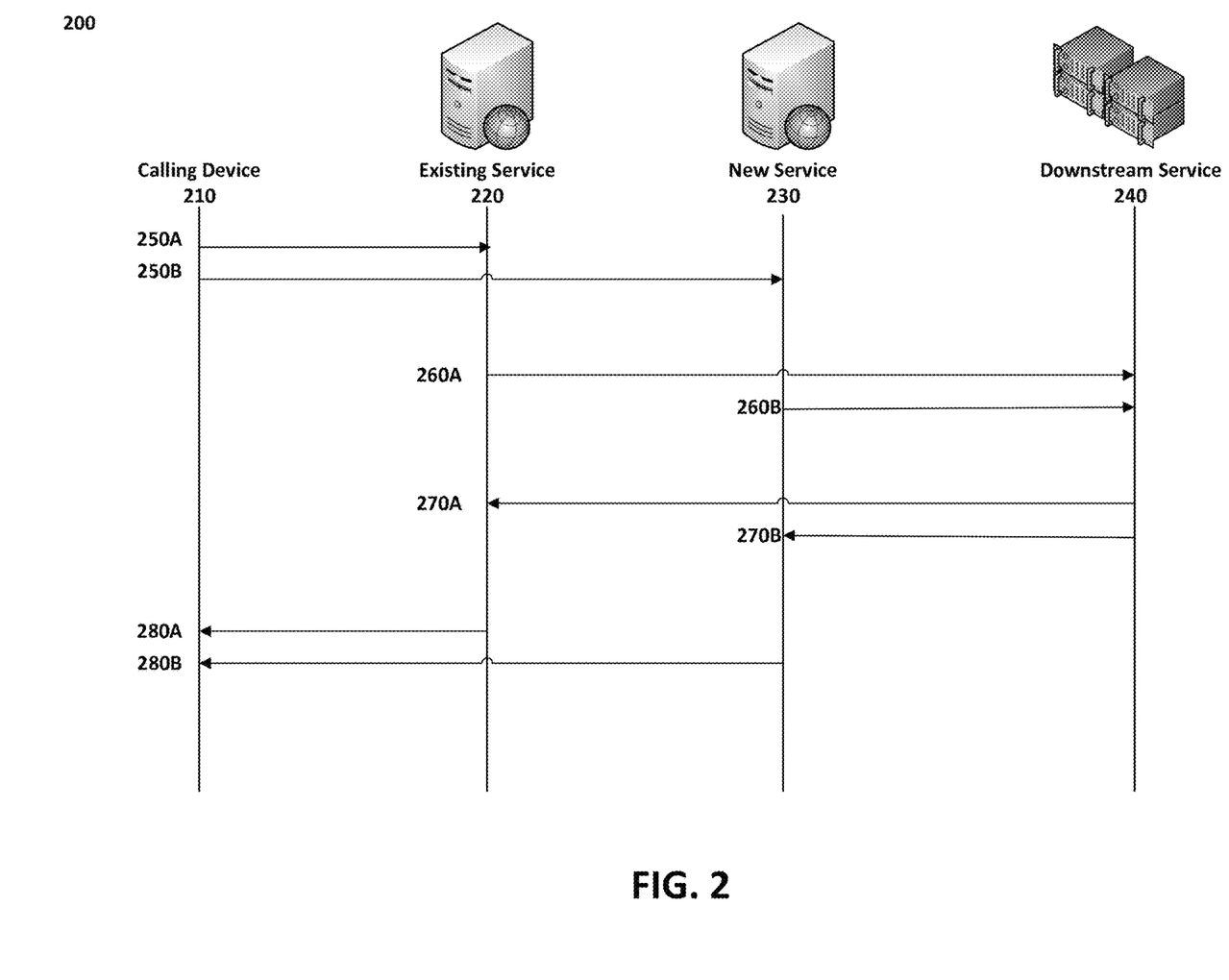
FIG. 2 illustrates an exemplary chart of communications within a system for shadow testing.

FIG. 2 illustrates an exemplary chart of communications 200 within a system for shadow testing. The devices communicating include a calling device 210, existing service 220, new service 230, and one or more downstream services 240. A first set of communications 250A-280A involve the existing service 220, while a second set of communications 250B-280B occurs in parallel and involve the new service 230.

The calling device 210 (e.g., calling device 150)—which may be an external client device or server requesting an internal service—may be configured to implement shadow testing. Where the calling device 210 is an external client device, configuration may involve pushing or otherwise downloading certain information to the external client device (e.g., via content delivery network server 130. Where the calling device 210 is a server requesting an internal service, configuration may occur via dynamic configuration that specifies where the server reads from or writes to. In some embodiments, configuration of the calling device 210 may involve programming a switch that allows the calling device 210 to switch between calling the existing service 220, calling the new service 230, and a shadow testing mode where parallel calls are made to both existing service 220 and new service 230.

In shadow testing mode, calling device 210 may detect a need to call existing service 230. The calling device 210 may therefore send a call 250A to the existing service 220, as well as an asynchronous call 250B sent in parallel to new service 230. The existing service 220 may receive the call 250A and send a call 260A to one or more downstream services 240 in order to process a responsive result. For example, certain functions may require input from other servers. Existing service 220 may receive one or more results 270A from the downstream servers, which may be used to provide a result 280A to the calling device 210, which uses the result 280A in accordance with normal operation. The entire existing service workflow 250A-280A may therefore proceed normally and as expected in a manner agnostic to the presence of new service 230 or shadow testing thereof. Service by existing service 220 to calling device 210 is therefore not impacted.

Meanwhile, the new service 230—which corresponds to the existing service 220—may receive the asynchronous call 250B and send a call 260B to the downstream services 240 as well. New service 230 may receive one or more results 270B from the downstream servers, which may be used to provide a result 280B to the calling device 210. Data regarding the result 280B from new service 230 may be logged, tracked, and analyzed. The actual result 280B, however, may be discarded and otherwise excluded from normal operation by the calling device 210. The new service workflow 250B-280B therefore simulates how the particular service—currently provided by existing service 220 and projected to be provided by new service 230 at some point—would be provided by new service 230 to calling device 210. Because the existing service workflow 250A-280A is occurring in parallel, however, service to calling device 210 is not impacted in the event any failures or other service issues arise in the new service workflow 250B-280B.

Data regarding the result 280B (and/or the entire new service workflow from 250B-280B) may be logged and stored (e.g., by shadow testing data server 140). Such data may also be compared to data regarding the result 280A (and/or existing service workflow 250A-280B) to evaluate how new service 230 performs in comparison to performance by existing service 220. Such comparison may identify differences indicative of failures or other performance issues involved in the new service workflow 250B-280B. Additional evaluation may further include generating one or more measurements or metrics to identify errors, latency, loading performance issues, etc. In some instances, the measurements and analysis may focus on the new service workflow between when call 250B is received at the new service 230 and when the final result 280B is sent from the new service. As such, analysis may not include a time the call 250B is sent from or result 280B received by the calling device 210.

In some embodiments, the evaluation may identify whether the issue relates to operations at the new service 230 or during interactions with downstream services 240. As such, a map may be generated to illustrate traffic within new service workflow 250B-280B. Such map, which may be based on the data from calls 260B to and results 270B from various interactions with multiple downstream services 240, may be structured to provide a circuit breaker pattern and identify where failures or other service issues arise.

Figure 3:
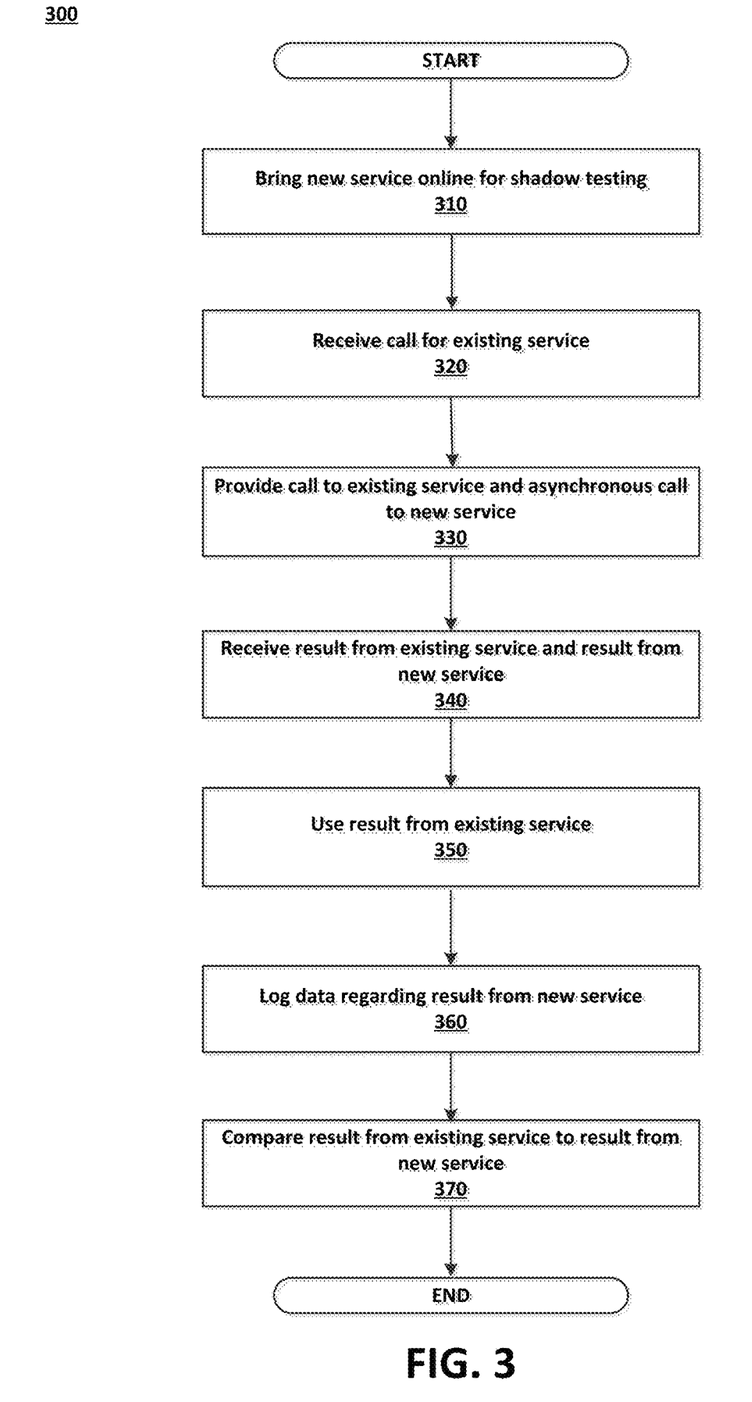
FIG. 3 is a flowchart illustrating an exemplary method for shadow testing.

FIG. 3 illustrates a method 300 for shadow testing. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 of FIG. 3, the new service may be designated for shadow testing. A call may be received for the existing service from a calling device. The received call may be provided to the existing service, while an asynchronous call corresponding to the received call may be provided to the new service. A result may be received from the existing service in response to the provided call, and a result may be received from the new service in response to the asynchronous call. The result received from the existing service may be used in responding to the received call. Data regarding the result received from the new service may be logged, but the result received from the new service may be excluded from use in responding to the received call. One or more metrics evaluating performance by the new service may be generated.

In step 310, a new service 230 may be brought online and designated for shadow testing. Such designation may involve configuring a calling device 210 to make parallel calls to the new service 230 and to an existing service 220 that corresponds to the new service 230. Such configuration may further specify that the calling device 210 only use the result 280A from the existing service 220, however, while excluding the result 280B from the new service 230. In some embodiments, the calling device 210 may be configured to limit parallel calls to a specified proportion of calls sent to existing service 220.

In step 320, calling device 210 may identify a need to make a call for existing service 220. Such need may arise in the course of normal operation of the calling device 210, whether in response to end-user/customer requests or calls from other servers.

In step 330, calling device 210 makes a call 250A to existing service 220 and an asynchronous call 250B to new service 230. Such call 250A and asynchronous call 250B by the calling device 210 may therefore initiate two parallel workflows: an existing service workflow 250A-2180B and a new service workflow 250B-280B. Depending on whether existing service 220 (and corresponding new service 230) may need to call on one or more downstream services 240, downstream calls 260A from existing service 220 and downstream calls 260B may be made from new service 230. Existing service 220 and new service 230 may subsequently receive downstream results 270A and 270B, respectively, from the downstream services 240.

In some embodiments, shadow testing based on asynchronous calls may be implemented via new code (e.g., specific to a new region in a multi-regional environment). Alternatively, a global (or otherwise multi-regional) traffic routing service may automatically duplicate a configurable portion of global traffic designated for shadow testing. As such, shadow testing traffic and communications such as illustrated in FIG. 2 may be limited to a specified portion of the global environment, as well as configured (and reconfigured) as needed. For example, such controls may allow for shadow testing of specified new services 230 (e.g., in certain regions), as well as controlling calls to certain specified downstream services 240. As noted, the services—new services 230 being tested and downstream services 240 being called by the same—may be specified by region, type, and other factors.

In step 340, a result 270A may be sent from existing service 220, and a result 270B may be sent from new service 230. Such results 270A and 270B may be received by calling device 210.

In step 350, calling device 210 may use the result 270A from existing service 220 in accordance with normal operation by the calling device 210 and existing service 220. The calling device 210 may discard the result 270B from new service 230, however. Such different processing of the results 270A and 270B may be the result of configuration of the calling device 210 as may occur in step 310 in response to designation of the new service 230 for shadow testing.

In step 360, data regarding the new service workflow 250B-280B may be logged. In addition, such data may be analyzed, and metrics may be generated to measure and evaluate performance by the new service 230.

In step 370, data regarding the new service workflow 250B-280B (and related measurements and metrics) may be compared to that for the existing service workflow 250A-280B. Such comparison may indicate better or worse latency, number of errors, loading performance, and other operational aspects related to new service 230.

Figure 4:
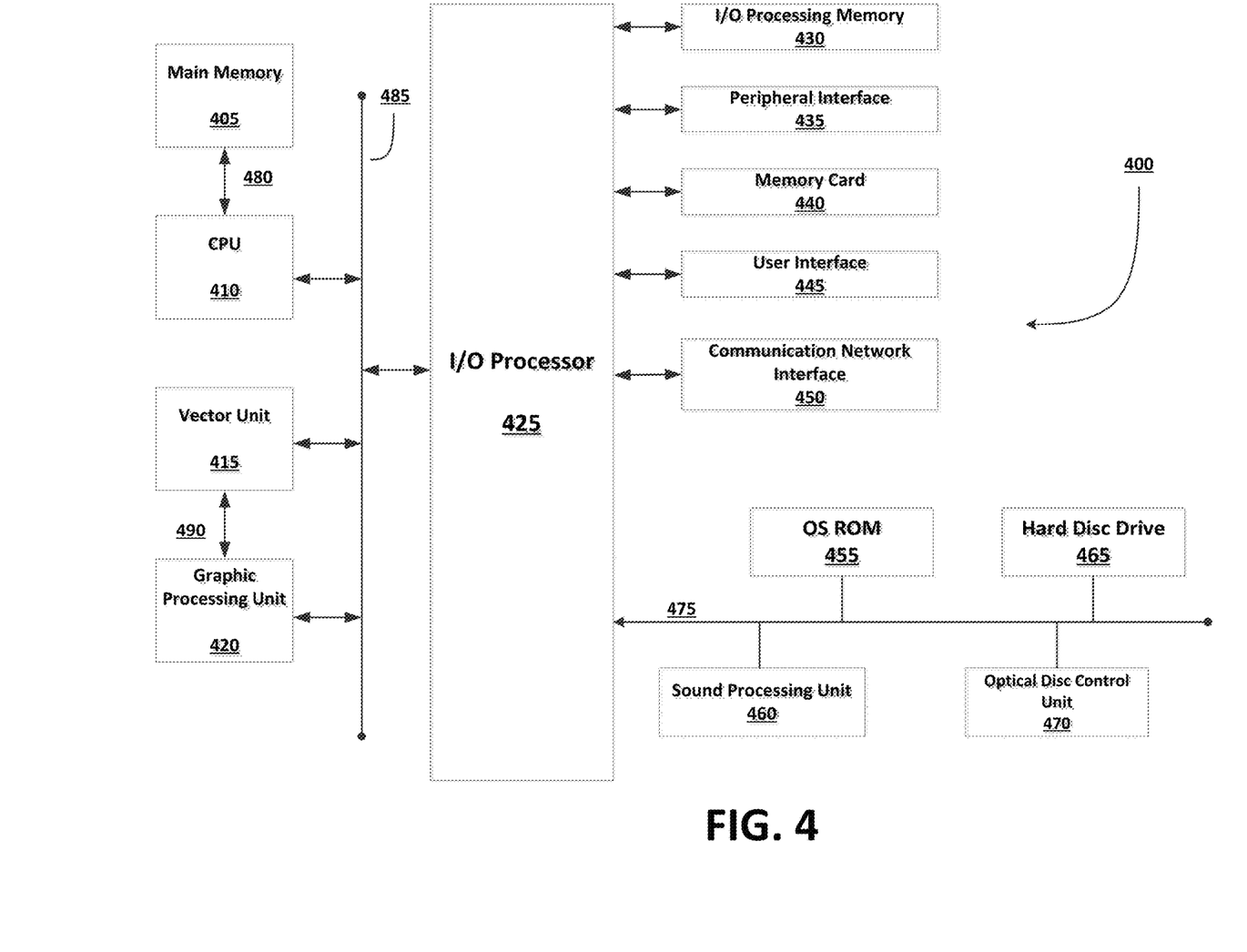
FIG. 4 is an exemplary electronic entertainment system that may be used in shadow testing.

FIG. 4 is an exemplary client electronic entertainment system that may be used in shadow testing. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for shadow testing, the method comprising:
dynamically configuring a calling device for shadow testing of a designated new service corresponding to an existing service, wherein the calling device is provided with a service configuration for the existing service and a different service configuration for the new service;
identifying a need to call the existing service that corresponds to the new service designated for shadow testing;
sending a call from the calling device to a server of the existing service based on the service configuration for the existing service, wherein a parallel call is sent to a servicer of the new service based on the service configuration for the new service;
receiving a result from the existing service in response to the call sent to the existing service, wherein the result received from the existing service is based on an interaction by the existing service with at least one downstream service;
receiving a result from the new service in response to the parallel call wherein the result from the new service is based on an interaction by the new service with the at least one downstream service;
generating the response to the call based on the result received from the existing service regarding the interaction by the existing service with the at least one downstream service, wherein data is logged in memory regarding the result based on the interaction by the new service with the at least one downstream service, and wherein the result received from the new service is excluded from use by the calling device in generating the response to the identified need;

generating one or more metrics evaluating performance, wherein generating the metrics include taking measurements of the performance by the existing service and of the performance by the new service in relation to the at least one downstream service; and comparing the metrics of the existing service to the metrics of the new service.

2. The method of claim 1, wherein the service configuration for the new service includes programming a switch of the calling device to be able to switch between calling the existing service, calling the new service, and shadow testing.

3. The method of claim 1, wherein the parallel call to the new service designated for shadow testing comprises one or more asynchronous calls sent to the new service in accordance with a specified proportion of calls.

4. The method of claim 1, further comprising generating a configuration map illustrating a usage pattern in the new service of the at least one downstream service.

5. The method of claim 4, wherein the configuration map corresponds to a circuit breaker pattern.

6. The method of claim 4, wherein the configuration map indicates a plurality of downstream services and identifies an error in relation to at least one of the plurality of downstream services.

7. The method of claim 1, wherein the logged data is indicative of the performance by the new service, the performance concerning at least one of latency, number of errors, and loading performance.

8. The method of claim 1, wherein at least one of the measurements pertain to latency, and wherein the latency measurement is taken between a time the call was received from the calling device and a time the result is received from the new service.

9. The method of claim 1, further comprising identifying that the metrics regarding the new service meets a threshold and redirecting all subsequent calls for the existing service to the new service.

10. The method of claim 1, wherein the calling device is an external client device, and wherein dynamically configuring the calling device further comprises providing one or more of the service configurations to the external client device via a content delivery network server, wherein the external client downloads one or more of the service configurations from the content delivery network server.

11. The method of claim 1, wherein the calling device is a calling server and the identified need is an internal service.

12. The method of claim 11, wherein dynamically configuring the calling server for shadow testing comprises configuring where the calling server reads from or writes to in relation to the existing service.

13. The method of claim 1, further comprising designating the new service for shadow testing based on a specified type of the at least one downstream service.

14. The method of claim 1, further comprising designating the new service for shadow testing based on a specified region in a multi-region global environment.

15. The method of claim 1, further comprising duplicating a portion of global traffic, the duplicated portion designated for shadow testing.

16. The method of claim 15, further comprising reconfiguring to designate a different portion of the global traffic for shadow testing.

17. The method of claim 1, further comprising designating the new service for shadow testing based on a specified type of the new service.

18. A non-transitory computer-readable storage medium, having embodied thereon a program executable by a processor to perform a method for shadow testing, the method comprising:

dynamically configuring a calling device for shadow testing of a designated new service corresponding to an existing service, wherein the calling device is provided with a service configuration for the existing service and a different service configuration for the new service;

identifying a need to call the existing service that corresponds to the new service designated for shadow testing;

sending a call from the calling device to a server of the existing service based on the service configuration for the existing service, wherein a parallel call is sent to a servicer of the new service based on the service configuration for the new service;

receiving a result from the existing service in response to the call sent to the existing service, wherein the result from existing service is based on an interaction by the existing service with at least one downstream service;

receiving a result from the new service in response to the parallel call wherein the result from the new service is based on an interaction by the new service with the at least one downstream service;

generating a response to the identified need based on the result received from the existing service regarding the interaction by the existing service with the at least one downstream service, wherein data is logged in memory regarding the result based on the interaction by the new service with the at least one downstream service, and wherein the result received from the new service is excluded from use in generating the response to the identified need;

generating one or more metrics evaluating performance, wherein the generating the metrics include taking measurements of the performance by the existing service and of the performance by the new service in relation to the at least one downstream service; and comparing the metrics of the existing service to the metrics of the new service.

* * * * *